United States Patent

Lorenz et al.

(10) Patent No.: US 9,519,723 B2
(45) Date of Patent: Dec. 13, 2016

(54) AGGREGATING ELECTRONIC CONTENT ITEMS FROM DIFFERENT SOURCES

(71) Applicant: Adobe Systems Incorporated, San Jose, CA (US)

(72) Inventors: Jon Lorenz, San Francisco, CA (US); Justin Velo, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 590 days.

(21) Appl. No.: 13/621,925

(22) Filed: Sep. 18, 2012

(65) Prior Publication Data

US 2014/0081974 A1    Mar. 20, 2014

(51) Int. Cl.
*G06F 17/30* (2006.01)

(52) U.S. Cl.
CPC ....... *G06F 17/3087* (2013.01); *G06F 17/3089* (2013.01); *G06F 17/30241* (2013.01)

(58) Field of Classification Search
USPC .......................................................... 707/737
See application file for complete search history.

(56) References Cited

U.S. PATENT DOCUMENTS

| | | | |
|---|---|---|---|
| 6,266,649 B1 * | 7/2001 | Linden et al. | 705/7.29 |
| 7,774,139 B1 * | 8/2010 | Rose et al. | 702/3 |
| 8,352,455 B2 * | 1/2013 | Tareen et al. | 707/711 |
| 8,694,501 B1 * | 4/2014 | Trandal et al. | 707/736 |
| 8,793,255 B1 * | 7/2014 | Bilinski | G06F 17/30867 707/740 |
| 2010/0076994 A1 * | 3/2010 | Soroca | G06F 17/30749 707/769 |
| 2011/0040760 A1 * | 2/2011 | Fleischman et al. | 707/737 |
| 2012/0117110 A1 * | 5/2012 | Amidon et al. | 707/770 |
| 2012/0215773 A1 * | 8/2012 | Si | G06Q 30/02 707/723 |

\* cited by examiner

*Primary Examiner* — Sherief Badawi
*Assistant Examiner* — Christopher J Raab
(74) *Attorney, Agent, or Firm* — Kilpatrick Townsend & Stockton LLP

(57) ABSTRACT

Systems and methods are provided for aggregating relevant electronic content items that are relevant to one another. In one embodiment, a content management application determines that a first electronic content item and a second electronic content item are relevant to one another. The first electronic content item is provided by a first client account and the second electronic content item is provided by a second client account. The content management application also aggregates the first and second electronic content items to form at least part of a collection of electronic content. The first and second electronic content items are aggregated based on determining that the first and second electronic content items are relevant to one another. The content management application also provides access to the collection of electronic content.

19 Claims, 4 Drawing Sheets

AGGREGATING ELECTRONIC CONTENT ITEMS FROM DIFFERENT SOURCES

TECHNICAL FIELD

This disclosure relates generally to computer-implemented methods and systems and more particularly relates to aggregating electronic content.

BACKGROUND

Social media services and other internet applications may allow users to store and manage items of electronic content. Examples of electronic content can include text, email, music, photographs, images, audio, videos, blogs, and other shared content. Various existing solutions allow multiple users to upload different items of electronic content. Such items of electronic content may share common attributes. Examples of such common attributes are common time periods, common geographic locations, similar or overlapping content features, etc. Such solutions do not adequately allow different users to identify, associate, organize, or track electronic content items that may be relevant to one another.

SUMMARY

One embodiment involves a content management application determining that a first electronic content item and a second electronic content item are relevant to one another. The first electronic content item is provided by a first client account and the second electronic content item is provided by a second client account. The embodiment also involves the content management application aggregating the first and second electronic content items to form at least part of a collection of electronic content. The first and second electronic content items are aggregated based on determining that the first and second electronic content items are relevant to one another. The embodiment also involves the content management application providing access to the collection of electronic content.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
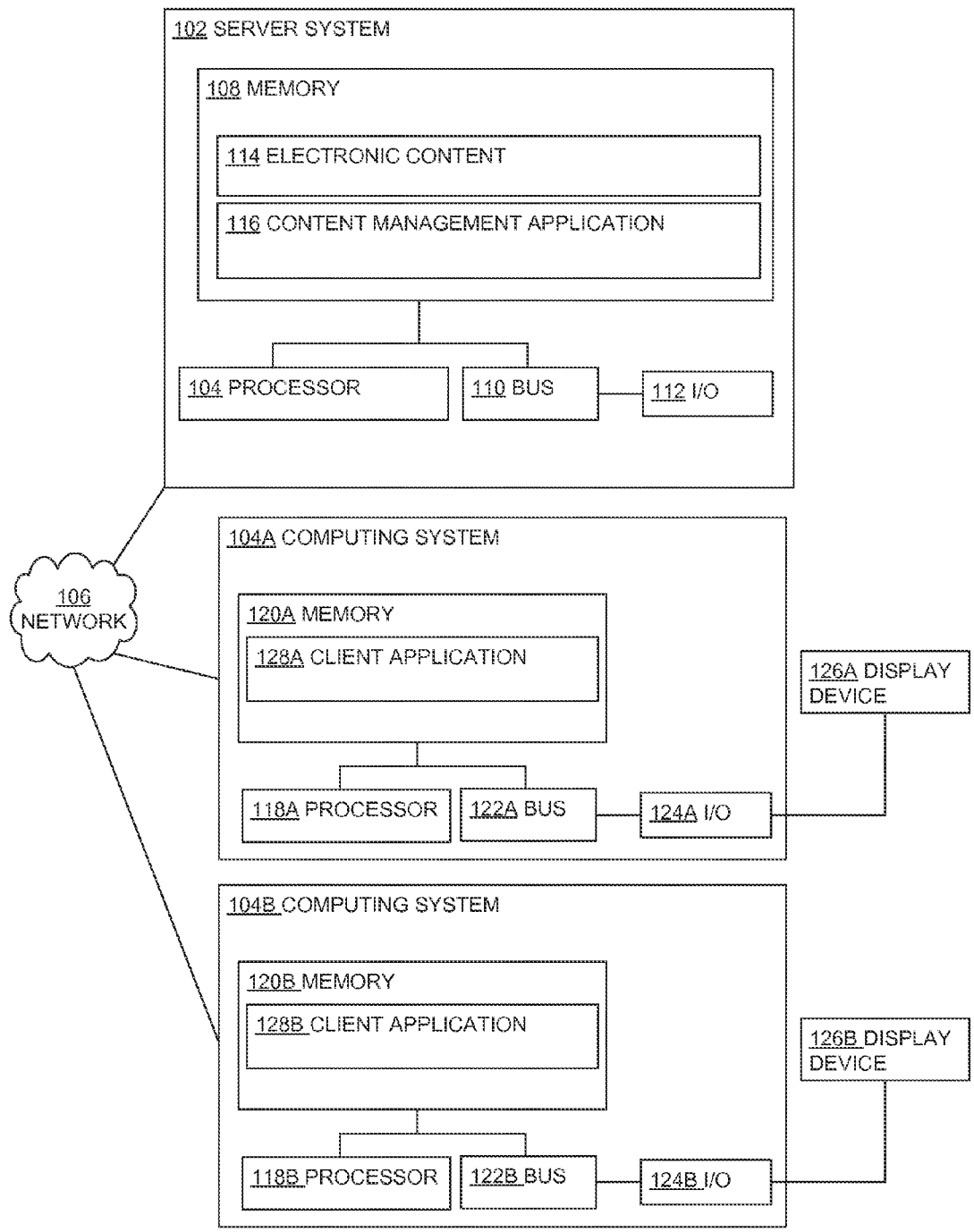
FIG. 1 is a block diagram depicting example computing systems for implementing certain embodiments.

Computer-implemented systems and methods are disclosed for aggregating electronic content items from different sources. For example, a social media application may include electronic content, such as images or videos, associated with different sources, such as different client accounts. A first client account may include a collection of images associated with an event, such as a vacation to Scotland. The second client account may include a collection of videos associated with the same vacation to Scotland. Neither of the first client account or the second client account may include any data explicitly associating the collection of images with the collection of videos. The social media application can automatically determine that the images and the videos are relevant to the same event (i.e., the vacation to Scotland). The social media application can determine that the images and the videos are relevant to the same event based on identifying that the images and the videos are associated with the same period of time and same geographic location. The social media application can further determine that the images and the videos are relevant to the same event based on identifying shared content among the images and the videos, such as images of the same person in both the images and the video. The social media application can aggregate the images and the videos by associating the images and the videos to form at least part of a common collection of electronic content depicting the vacation to Scotland. The social media application can provide the common collection of electronic content to the first client account and the second client account. Aggregating the images and the videos can provide additional content relevant to each of the first client account and the second client account without either client explicitly identifying the association between the images and the videos.

In accordance with one embodiment, a content management application or other application is provided for aggregating electronic content items from different sources. The content management application can determine that a first electronic content item and a second electronic content item should be aggregated to form part or all of a single collection of electronic content provided by the content management application. The first electronic content item is provided by a first client account. The second electronic content item is provided by a second client account. The content management application can aggregate the first electronic content item and the second electronic content item with the collection of electronic content. The electronic content items are aggregated with the collection of electronic content based on determining the first electronic content item and the second electronic content item are relevant to the collection of electronic content. The content management application can provide the collection of electronic content. In some embodiments, the collection of electronic content may be accessed via the first client account and/or the second client account.

As used herein, the term "electronic content" is used to refer to any type of media that can be rendered for display or use at a computing system or other electronic device. Electronic content can include text or multimedia files, such as images, video, audio, or any combination thereof. Electronic content can also include application software that is designed to perform one or more specific tasks at a computing system.

As used herein, the term "electronic content item" is used to refer to any item of electronic content that may be included in a collection of data. An electronic content item can include, for example, a text file or string, an image, a video, an audio file, a combination of one or more texts, images, video, audio content, etc.

As used herein, the term "client" is used to refer to an application and/or a device executing an application accessing a moderator application or other application via a client account. A client account can include an identifier for an entity, such as an individual. A client account can also include one or more authentication credentials, such as a password, personal identification number, a security question and an associated answer, etc. A client account can be associated with or provided by a network service, such as (but not limited to) a social media service or a cloud service. In some embodiments, a single client corresponding to a single client account can be associated with a single computing device. In other embodiments, multiple clients corresponding to multiple respective accounts can be associated with a single computing device. In other embodiments, a single client corresponding to a single client account can be associated with multiple computing devices.

As used herein, the term "social media service" is used to refer to a network service providing interactive communication regarding electronic content among entities such as organizations, communities, individuals, etc. A social media service can provide a repository of electronic content. A social media service can include client accounts. Each client account may be associated with one or more electronic content items stored by or otherwise accessible via the social media service. Client accounts may be associated with one another. Non-limiting examples of associations between client accounts include direct relationships between client accounts, such as two client accounts being "friends," and indirect relationships between client accounts, such as two client accounts being members of a group provided by the social media service. In some embodiments, a social media service provides one or more applications for a first client to append electronic content, such as tags or comments, to electronic content items associated with a second client that has a direct or indirect relationship with the first client.

As used herein, the term "cloud service" is used to refer to a network service for providing access to a repository of electronic content. A cloud service can include one or more applications for sharing, modifying, delivering, or otherwise using electronic content. A cloud service can include client accounts. Each client account may be allowed to modify or otherwise access specific electronic content items in a repository of electronic content provided by the cloud service.

As used herein, the term "aggregating" is used to refer to providing a common interface or other logical access point for accessing electronic content items from different sources.

In some embodiments, aggregating relevant electronic content items from different sources, such as different client accounts, can include providing a virtual community for the different client accounts. A virtual community can include a network of clients, electronic content associated with the clients, and a description of relationships among the clients and the electronic content. In some embodiments, the clients and the electronic content may be provided by different network services, such as social media services or cloud services. In other embodiments, the clients may also be identified as friends in a social media service, in a group defined by a social media service, etc. The virtual community may autonomously provide access to electronic content items relevant to a given client account. Autonomously providing access to relevant electronic content items includes determining relationships between the electronic content items without a client specifying the relationship.

In additional or alternative embodiments, a content management application or other application determines that electronic content items are relevant to a collection of electronic content by identifying a common geographic location associated with the electronic content items. Non-limiting examples of a geographic location associated with an electronic content item include a specified area (such as a radius around a set of coordinates or an area delineated by specific boundaries), a specific polity (e.g., state, city, province, etc.), and the like. The content management application or other application also determines that at least one electronic content item in the collection of electronic content is associated with the geographic location. The content management application or other application can determine the geographic location associated with a given electronic content item by referencing metadata associated with the electronic content item.

As used herein, the term "metadata" is used to refer to information associated with (and generally but not necessarily stored with) an electronic content item that describes a feature of the electronic content item. Metadata may describe a location or identification of electronic content. Non-limiting examples of metadata for an electronic content item can include a title, author, keywords, and the like. Metadata may also describe a relationship between a first electronic content item and a second electronic content item, such as how the first and second electronic content items can be combined and sequenced for a multimedia presentation. Metadata can also describe when and how an electronic content item was created, a file type and other technical information for the electronic content item, and/or access rights for the electronic content item. In some embodiments, metadata includes data included in the electronic content item that is not displayed by a client application using the electronic content item.

In additional or alternative embodiments, a content management application or other application can determine that electronic content items are relevant to a collection of electronic content by identifying a common time period associated with the electronic content items. Non-limiting examples of a time period associated with an electronic content item include a date that an electronic content item was created or a time period described in a tag that is applied to the electronic content item. The content management application can identify a first period of time associated with the first electronic content item and a second period of time associated with the second electronic content item. The content management application or other application can determine the time period associated with a given electronic content item by referencing metadata associated with the electronic content item. The content management application can determine that the first period of time and the second period of time are included in the additional period of time associated with the collection of electronic content.

In additional or alternative embodiments, a content management application or other application can determine that electronic content items are relevant to a collection of electronic content based on interactions with the respective electronic content items. For example, the content management application can receive input associated with the second client account. The input represents an interaction with a first electronic content item that is included in the collection of electronic content. In one embodiment, the interaction may include associating textual content with the first electronic content item that identifies a first portion of the first electronic content. A portion of an electronic content item may be identified by, for example, associating a tag with the portion of the electronic content item. The content management application determines that a portion of a second item of electronic content includes the same identification. In another embodiment, the interaction may include a selection of a portion of the first electronic content item having content identical to at least one additional portion of the second electronic content item. In one example, the interaction may include zooming to a portion of an image that includes an individual or other entity that is also included in a second image. In another example, the interaction may include selecting a string of text in a first content item that is included in a second content item.

As used herein, the term "tag" is used to refer to a record or other data including a description that may be associated with a content item or a portion of the content item. The description can include one or more words identifying a category to which the content item or portion of the content item belongs. Non-limiting examples of a description include a keyword or label associated with a content item. Non-limiting examples of a category can include an identity of an individual or other entity.

In an example embodiment, the content management application can aggregate the electronic content items with the collection of electronic content by providing links to the first electronic content item and the second electronic content item. The links are accessible via the collection of electronic content. In additional or alternative embodiments, different client accounts may be associated with different client applications configured for accessing the collection of electronic content. For example, a first client account may be associated with a first social media application or other client application and the second client account may be associated with a second social media application or other client application. The first client application provides a first set of functions different from a second set of functions provided by the second client application.

Referring now to the drawings, FIG. 1 is a block diagram depicting exemplary computing systems for implementing certain embodiments. The exemplary computing systems include a server system 102 and computing systems 104a, 104b in communication via a network 106.

The server system 102 comprises a computer-readable medium such as a processor 104 that is communicatively coupled to a memory 108 and that executes computer-executable program instructions and/or accesses information stored in the memory 108. The processor 104 may comprise a microprocessor, an ASIC, a state machine, or other processor. The processor 104 can include any of a number of computer processing devices, including one. Such a processor can include or may be in communication with a computer-readable medium storing instructions that, when executed by the processor 104, cause the processor to perform the steps described herein.

The server system 102 can provide access to electronic content 114. The electronic content 114 may be resident in any suitable computer-readable medium and execute on any suitable processor. In one embodiment, the electronic content 114 can reside in the memory 108 at the server system 102. In another embodiment, the electronic content 114 can be accessed by the server system 102 from a remote location via the network 106 and provided to the computing systems 104a, 104b and the server system 102.

A content management application 116 stored in the memory 108 can configure the processor 104 to manage and provide access to electronic content 114. The content management application 116 can configure the processor 104 to store some or all of the electronic content 114 in the memory 108 or any other suitable computer-readable medium. The content management application 116 may provide a social media service, a cloud service, or other network service providing access to electronic content by multiple clients.

The server system 102 may also comprise a number of external or internal devices such as input or output devices. For example, the server system 102 is shown with an input/output ("I/O") interface 112. A bus 110 can also be included in the server system 102. The bus 110 can communicatively couple one or more components of the server system 102.

FIG. 1 also illustrates the content management application 116 comprised in the memory 108 of the server system 102. The content management application 116 can include one or more modules. The content management application 116 can configure the server system 102 to modify, provide, or otherwise use the electronic content 114 in response to input provided by the client applications 128a, 128b. The content management application 116 can also configure the server system 102 to allow multiple computing systems 104a, 104b or other client systems to access or otherwise use some or all of the electronic content 114, as described in detail below with respect to FIGS. 2 and 3.

The server system 102 can include any suitable computing system for hosting the content management application 116. In one embodiment, the server system 102 may be a single computing system. In another embodiment, the server system 102 may be a virtual server implemented using a number of computing systems connected in a grid or cloud computing topology.

Each of the computing systems 104a, 104b comprises a computer-readable medium such as processors 118a, 118b, respectively. Each of the processors 118a, 118b is communicatively coupled to a memory 120a, 120b, respectively. Each of the processors 118a, 118b respectively executes computer-executable program instructions and/or accesses information stored in the memory 120a, 120b. Each of the processors 118a, 118b may comprise a microprocessor, an application-specific integrated circuit ("ASIC"), a state machine, or other processor. Each of the processors 118a, 118b can include any of a number of computer processing devices, including one. Such a processor can include or may be in communication with a computer-readable medium. The computer-readable medium stores instructions that when executed by the processor, cause the processor to perform the steps described herein.

A computer-readable medium may comprise, but is not limited to, electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing systems 104a, 104b may also comprise a number of external or internal devices such as a mouse, a CD-ROM, DVD, a keyboard, a display, audio speakers, one or more microphones, or any other input or output devices. For example, each of the computing systems 104a, 104b is respectively shown with input/output ("I/O") interfaces 124a, 124b and display devices 126a, 126b. Buses 122a, 122*b* can be respectively included in the computing systems 104*a*, 104*b*. Each of the buses 122*a*, 122*b* can communicatively couple one or more components of the computing systems 104*a*, 104*b*.

FIG. 1 also illustrates the client applications 128*a*, 128*b* respectively comprised in the memory 120*a*, 120*b* of the computing systems 104*a*, 104*b*. Each of the client applications 128*a*, 128*b* can include one or more software modules. The client applications 128*a*, 128*b* can respectively configure the processors 118*a*, 118*b* to modify or otherwise access electronic content 114 provided by the server system 102 via the network 106. The client applications 128*a*, 128*b* can respectively configure the processors 118*a*, 118*b* to respectively render some or all of the electronic content 114 for display at the display devices 126*a*, 126*b*. For example, each of the client applications 128*a*, 128*b* can be an internet browser application, a social media application, and the like. A network session for accessing or otherwise modifying the electronic content 114 can be established by the client applications 128*a*, 128*b* via the network 106 between computing systems 104*a*, 104*b* and the server system 102.

In some embodiments, the computing systems 104*a*, 104*b* can include any suitable client devices for communicating via a network 106 and executing the client applications 128*a*, 128*b*. Non-limiting examples of a computing device include a desktop computer, a tablet computer, a smart phone, or any other computing device suitable for rendering electronic content. In other embodiments, the computing systems 104*a*, 104*b* can include server systems for providing electronic content items via the client applications 128*a*, 128*b*

The content management application 116 can be executed at the server system 102 by the processor 104 to provide aggregation of relevant items of the electronic content 114 from different sources.

Figure 2:
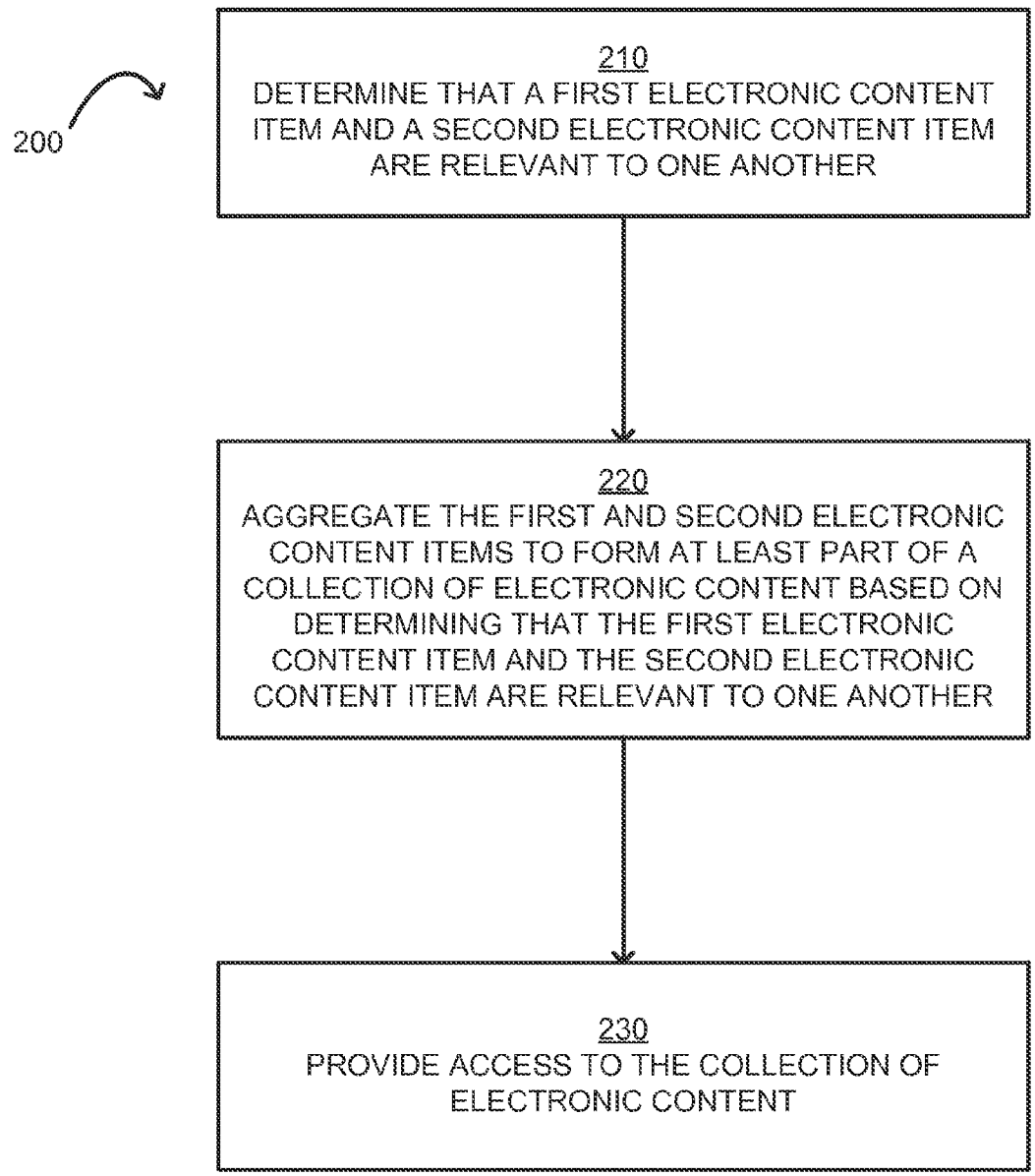
FIG. 2 is a flow chart illustrating an example method for aggregating relevant items of electronic content.

FIG. 2 is a flow chart illustrating an example method 200 for aggregating relevant items of electronic content 114. For illustrative purposes, the method 200 is described with reference to the system implementations depicted in FIG. 1. Other implementations, however, are possible.

The method 200 involves determining that a first electronic content item and a second electronic content item are relevant to one another, as shown in block 210. The processor 104 of the server system 102 can execute the content management application 116 to determine the relevance of the first and second electronic content items to a collection of the electronic content 114.

The first electronic content item is provided by a first client account. The second electronic content item is provided by a second client account. In one embodiment, the client application 128*a* can be executed at the computing system 104*a* to provide the first content item to or otherwise access the first content item at the content management application 116 via the first client account. The client application 128*b* can be executed at the computing system 104*b* to provide the second content item to or otherwise access the second content item at the content management application 116 via the second client account. In another embodiment, the client application 128*a* can be executed at the computing system 104*a* to provide the first content item to or otherwise access the first content item at a first content provider, such as a first social media service. The client application 128*b* can be executed at the computing system 104*b* to provide the first content item to or otherwise access the first content item at a second content provider, such as a second social media service different from the first social media service. The content management application 116 can modify or otherwise access the first content item at the first content provider and the second content item at the second content provider.

The content management application 116 may determine the relevance of the electronic content items to one another via any suitable mechanism. For example, the content management application 116 can receive input associated with the second client account. The input represents an interaction with a first electronic content item that is included in the collection of electronic content. In one embodiment, the interaction may include associating textual content, such as a tag or comment, with the first electronic content item. The textual content may identify a first portion of the first electronic content. A portion of an electronic content item may be identified by, for example, associating a tag with the portion of the electronic content item. The content management application 116 determines that a portion of a second item of electronic content includes the same identification. The content management application 116 determines that the first and second electronic content items are relevant to one another based on both items having a portion with a common identification.

In additional or alternative embodiments, the content management application may provide different weights of relevance for electronic content items. The content management application 116 determines that the relevance of an electronic content item is increased or decreased based on, for example, a number of tags associated with an electronic content item, the frequency with which clients interact with the electronic content item, the number of social media services via which the electronic content item is shared, etc.

In another embodiment, the interaction may include a selection of a portion of the first electronic content item having content identical to at least one additional portion of the second electronic content item. In one example, the interaction may include zooming to, tagging, or otherwise selecting a portion of an image that includes an individual, object, or other entity. The content management application 116 determines the identity of the individual or other entity. The content management application 116 can determine that the second client account is associated with the identified individual or entity. The content management application 116 can determine that the second electronic content item associated with the second client account also includes the individual, object, or other entity.

The method 200 further involves aggregating the first and second electronic content items to form at least part of a collection of electronic content 114 based on determining that the first electronic content item and the second electronic content item are relevant to one another, as shown in block 220. The processor 104 can execute the content management application 116 to aggregate the first and second electronic content items with the collection of electronic content 114.

In one embodiment, aggregating the first and second electronic content items with the collection of electronic content 114 may include providing links to the first electronic content item and the second electronic content item. The links are accessible via the collection of electronic content. For example, a content management application 116 or other application may store data in the memory 108 identifying an association between the first and second electronic content items and the collection of electronic content 114.

In another embodiment, aggregating the first and second electronic content items with the collection of electronic content 114 may include storing copies of the first and second electronic content items in the memory 108 with the collection of electronic content 114. The copies of the first and second electronic content items may include metadata identifying that the first and second electronic content items are respectively provided by or otherwise associated with the first and second client accounts.

The method 200 further involves providing access to the collection of electronic content 114, as shown in block 230. The processor 104 can execute the content management application 116 to provide access to the collection of electronic content 114 to the first client account and the second client account. For example, a content management application 116 or other application may send messages to the first client account and the second client account notifying the client accounts that the electronic content items are aggregated with the collection of electronic content 114.

Figure 3:
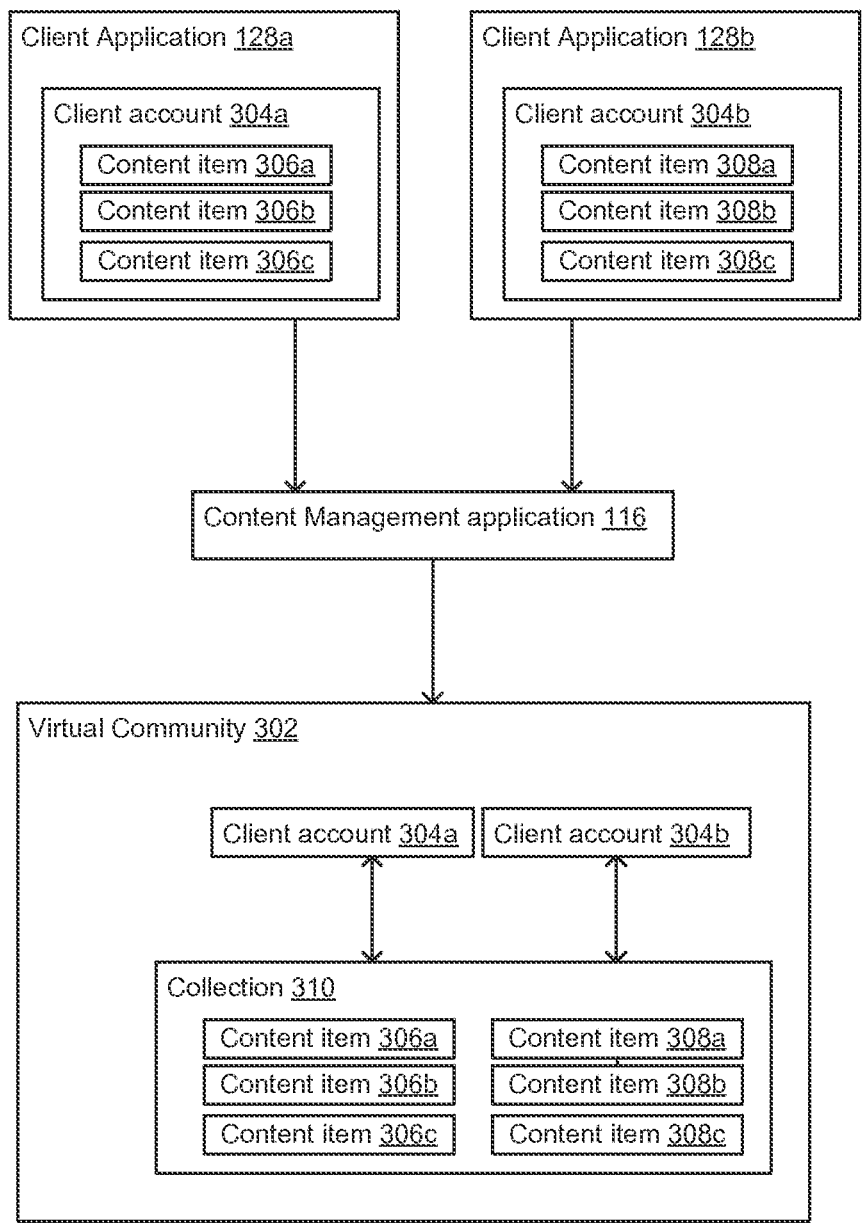
FIG. 3 is a modeling diagram illustrating an example virtual community for aggregating relevant items of electronic content.

In additional or alternative embodiments, the collection of electronic content 114 managed by the content management application 116 can thus provide a virtual community for the first and second client accounts separate from the client applications 128a, 128b. FIG. 3 is a modeling diagram illustrating an example virtual community 302 for aggregating relevant items of electronic content 114.

The virtual community 304 can include a network of clients and electronic content associated with the clients. A client application 128a can include a client account 304a that is associated with electronic content items 306a-c. In some embodiments, the electronic content items 306a-c are stored at or accessible via a computing system 104a that is a server system hosting the client application 128a. In other embodiments, the electronic content items 306a-c are stored at or accessible via a server system or other content provider that can be accessed by the computing system 104a executing the client application 128a. A client application 128b can include a client account 304b that is associated with electronic content items 308a-c. The client applications 128a, 128b can be, for example, different social media services or cloud services. In some embodiments, the electronic content items 308a-c are stored at or accessible via a computing system 104b that is a server system hosting the client application 128b. In other embodiments, the electronic content items 308a-c are stored at or accessible via a server system or other content provider that can be accessed by the computing system 104b executing the client application 128b.

The content management application 116 determines that electronic content items 306a-c are relevant to the electronic content items 308a-c. The content management application 116 aggregates the electronic content items 306a-c and electronic content items 308a into the collection 310. The content management application 116 provides access to the collection 310 of the virtual community 304 to the client accounts 304a, 304b.

In some embodiments, a collection 310 may be a preexisting collection of electronic content 114 separate from the electronic content items 306a-c and 308a-c. In other embodiments, the content management application 116 can generate the collection 310 to aggregate the electronic content items 306a-c and 308a-c based on the electronic content items 306a-c and 308a-c being relevant to one another.

Figure 4:
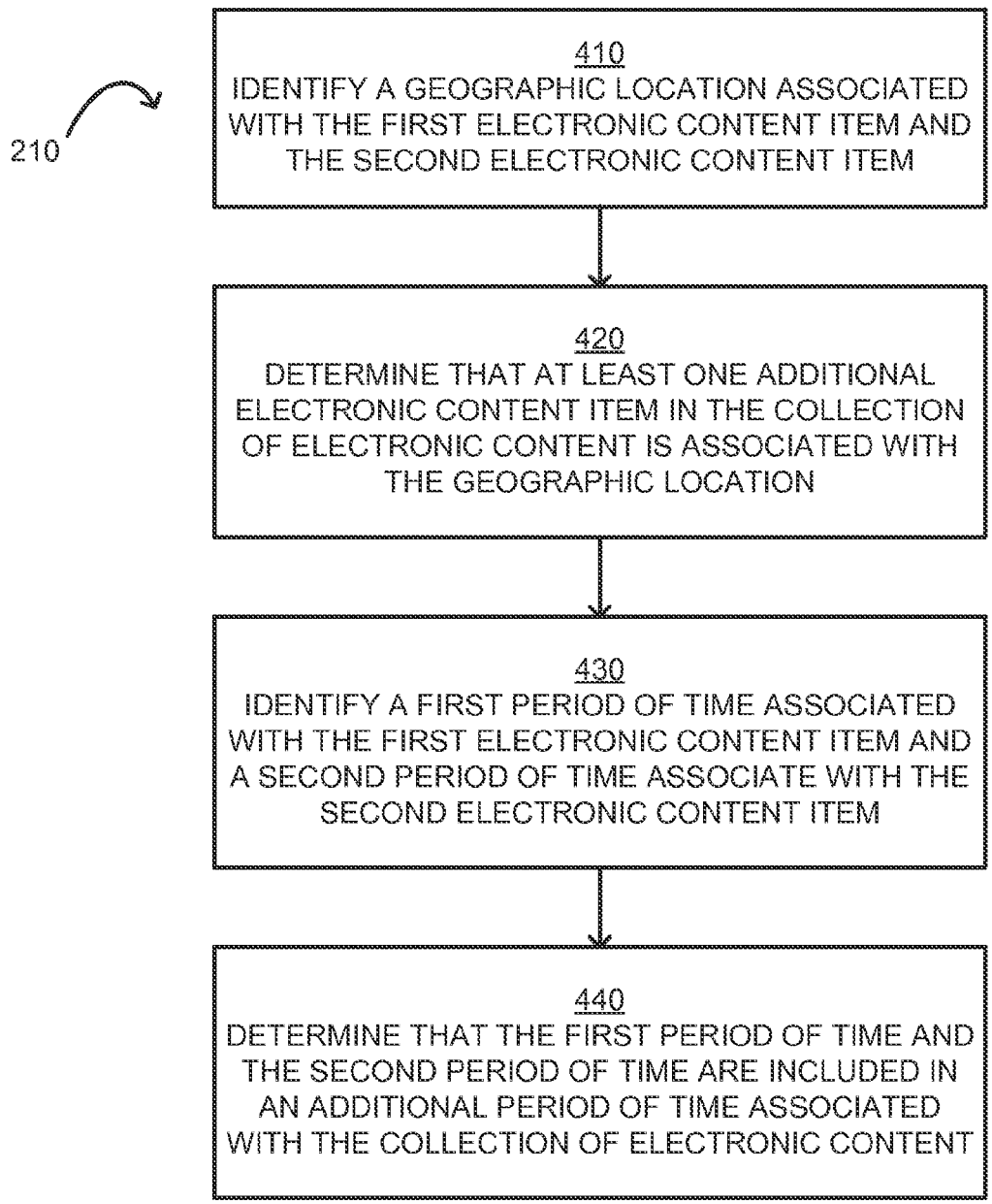
FIG. 4 is a flow chart illustrating an example method for determining the relevance of electronic content items from different sources.

FIG. 4 is a flow chart illustrating an example method for determining the relevance of electronic content items from different sources. For illustrative purposes, the method 300 is described with reference to the system implementations depicted in FIGS. 1 and 3. Other implementations, however, are possible.

Determining the relevance of electronic content items involves identifying a geographic location associated with the first electronic content item and the second electronic content item, as shown in block 410. The processor 104 of the server system 102 can execute the content management application 116 to identify the geographic location. The content management application 116 identifies the geographic location for each electronic content item using metadata of the respective content item that describes the geographic location.

Determining the relevance of electronic content items further involves determining that at least one additional electronic content item in the collection of electronic content 114 is associated with the geographic location, as shown in block 420. The processor 104 of the server system 102 can execute the content management application 116 to determine that one or more electronic content item in the collection of electronic content 114 are associated with the geographic location.

Determining the relevance of electronic content items further involves identifying a first period of time associated with the first electronic content item and a second period of time associated with the second electronic content item, as shown in block 430. The processor 104 of the server system 102 can execute the content management application 116 to identify the respective periods of time associated with the respective electronic content items. The content management application 116 identifies the time periods for each electronic content item using metadata of the respective content item that describes the time periods.

Determining the relevance of electronic content items further involves determining that the first period of time and the second period of time are included in an additional period of time associated with the collection of electronic content, as shown in block 440. The processor 104 of the server system 102 can execute the content management application 116 to determine that the first and second periods of time are included in an additional period of time. For example, a collection of electronic content 114 may be associated with a time period, such as a week or other range of dates, that corresponds to a vacation. A first electronic content item and a second electronic content item may respectively be associated with days that fall within the week corresponding to the vacation. The content management application 116 determines that the electronic content items are relevant to one another based on the dates respectively associated with the electronic content items being within the week.

Although FIG. 4 depicts block 210 of the method 200 as determining the relevance of electronic content items based on both a geographic location and a time period, other implementations are possible. For example, a content management application 116 may determine the relevance of electronic content items based on only a common geographic location or a common time period.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   determining, by a content management application, that a first electronic content item and a second electronic content item are relevant to one another, wherein the first electronic content item is provided by a first client account and the second electronic content item is provided by a second client account, wherein determining a relevance of the first electronic content item to the second electronic content item comprises:
   determining that an attribute of the first electronic content item is shared by content in a collection of electronic content and that an attribute of the second electronic content item is shared by content in the collection of electronic content,
   receiving input associated with the second client account and representing an interaction with the first electronic content item provided by the first client account, wherein the first electronic content item is included in a collection of electronic content,
   selecting the second electronic content item for comparison with the first electronic content item based on receiving the input representing the interaction with the first electronic content item, and
   determining, from first metadata of the first electronic content item and second metadata of the second electronic content item and based on selecting the second electronic content item, that a common geographic location and a common time period are depicted or described in both the first electronic content item and the second electronic content item;
   aggregating, by the content management application, the first electronic content item and the second electronic content item to form at least part of the collection of electronic content based on determining that the first electronic content item and the second electronic content item are relevant to one another; and
   providing, by the content management application, access to the collection of electronic content.

2. The method of claim 1 wherein determining that each of the first electronic content item and the second electronic content item is relevant to the collection of electronic content comprises determining that at least one additional electronic content item in the collection of electronic content is associated with the same geographic location as each of the first electronic content item and the second electronic content item.

3. The method of claim 2, wherein determining that the first electronic content item and the second electronic content item are relevant to the collection of electronic content further comprises:
   identifying a first period of time associated with the first electronic content item and a second period of time associated with the second electronic content item; and
   determining that the first period of time and the second period of time are included in an additional period of time that is associated with the collection of electronic content and that includes the common time period.

4. The method of claim 1, wherein the interaction comprises associating textual content comprising an identification of a first portion of the first electronic content item and wherein a second portion of the second electronic content item includes the same identification.

5. The method of claim 1, wherein the interaction comprises a selection of a portion of the first electronic content item having content identical to at least one additional portion of the second electronic content item.

6. The method of claim 1, wherein aggregating the first electronic content item and the second electronic content item to form the at least part of the collection of electronic content comprises providing a virtual community comprising links to the first electronic content item and the second electronic content item, wherein the links are accessible via the collection of electronic content, wherein the virtual community is accessible via the first client account and the second client account.

7. The method of claim 6, wherein the first client account is associated with a first social media application that accesses the collection of electronic content and the second client account is associated with a second social media application that accesses the collection of electronic content, wherein the first social media application provides a first set of functions different from a second set of functions provided by the second social media application.

8. The method of claim 1, wherein determining the relevance of the first electronic content item and to the second electronic content item to one another further comprises determining that a common object or individual is depicted in both first image content of the first electronic content item and second image content of the second electronic content item.

9. The method of claim 1, further comprising:
determining that a portion of the first electronic content item that receives the interaction comprises first image content, wherein the interaction comprises selecting or zooming to the first image content; and
matching the first image content to second image content from the second electronic content item, wherein the relevance of the first electronic content item to the second electronic content item is also determined based on matching the first image content to the second image content.

10. The method of claim 1, wherein the relevance of the first electronic content item to the second electronic content item is also determined based on a frequency with which clients interact at least one of the first electronic content item or the second electronic content item.

11. The method of claim 10, wherein the frequency is determined by a number of tags associated with the at least one of the first or second electronic content items or a number of social media services via which the at least one of the first or second electronic content items is shared.

12. A non-transitory computer-readable medium embodying program code executable by a processing device, the non-transitory computer-readable medium comprising:
program code for determining that a first electronic content item and a second electronic content item are relevant to one another, wherein the first electronic content item is provided by a first client account and the second electronic content item is provided by a second client account, wherein determining a relevance of the first electronic content item to the second electronic content item comprises:
determining that an attribute of the first electronic content item is shared by content in a collection of electronic content and that an attribute of the second electronic content item is shared by content in the collection of electronic content,
receiving input associated with the second client account and representing an interaction with the first electronic content item provided by the first client account, wherein the first electronic content item is included in a collection of electronic content,
selecting the second electronic content item for comparison with the first electronic content item based on receiving the input representing the interaction with the first electronic content item, and
determining, from first metadata of the first electronic content item and second metadata of the second electronic content item and based on selecting the second electronic content item, that a common geographic location and a common time period are depicted or described in both the first electronic content item and the second electronic content item;
program code for aggregating the first electronic content item and the second electronic content item to form at least part of the collection of electronic content based on determining that the first electronic content item and the second electronic content item are relevant to one another; and
program code for providing access to the collection of electronic content.

13. The computer-readable medium of claim 12, wherein determining that the first electronic content item and the second electronic content item are relevant to one another further comprises:
identifying the common geographic location associated with the first electronic content item and the second electronic content item; and
determining that at least one additional electronic content item in the collection of electronic content is associated with the common geographic location.

14. The computer-readable medium of claim 13, wherein determining that the first electronic content item and the second electronic content item are relevant to one another further comprises:
identifying a first period of time associated with the first electronic content item and a second period of time associated with the second electronic content item; and
determining that the first period of time and the second period of time are included in an additional period of time that is associated with the collection of electronic content and that includes the common time period.

15. The computer-readable medium of claim 12, wherein aggregating the first electronic content item and the second electronic content item with the collection of electronic content comprises providing a virtual community comprising links to the first electronic content item and the second electronic content item, wherein the links are accessible via the collection of electronic content, wherein the virtual community is accessible via the first client account and the second client account.

16. The computer-readable medium of claim 15, wherein the first client account is associated with a first client application configured for accessing the collection of electronic content and the second client account is associated with a second client application configured for accessing the collection of electronic content, wherein the first client application provides a first set of functions different from a second set of functions provided by the second client application.

17. A system comprising:
a processor; and
a non-transitory computer-readable medium communicatively included in or communicatively coupled to the processor,
wherein the processor is configured to execute instructions stored in non-transitory computer-readable medium and thereby perform operations comprising:
determining that a first electronic content item and a second electronic content item are relevant to one another, wherein the first electronic content item is provided by a first client account and the second electronic content item is provided by a second client account, wherein determining a relevance of the first electronic content item to the second electronic content item comprises:
determining that an attribute of the first electronic content item is shared by content in a collection of electronic content and that an attribute of the second electronic content item is shared by content in the collection of electronic content,
receiving input associated with the second client account and representing an interaction with the first electronic content item provided by the first client account, wherein the first electronic content item is included in a collection of electronic content, selecting the second electronic content item for comparison with the first electronic content item based on receiving the input representing the interaction with the first electronic content item, and determining, from first metadata of the first electronic content item and second metadata of the second electronic content item and based on selecting the second electronic content item, that a common geographic location and a common time period are depicted or described in both the first electronic content item and the second electronic content item;

aggregating the first electronic content item and the second electronic content item to form at least part of the collection of electronic content based on determining that the first electronic content item and the second electronic content item are relevant to one another; and providing access to the collection of electronic content.

18. The system of claim 17, wherein determining that the first electronic content item and the second electronic content item are relevant to one another further comprises:

determining that at least one additional electronic content item in the collection of electronic content is associated with the common geographic location;

identifying a first period of time associated with the first electronic content item and a second period of time associated with the second electronic content item; and determining that the first period of time and the second period of time are included in an additional period of time that is associated with the collection of electronic content and that includes the common time period.

19. The system of claim 17, wherein aggregating the first electronic content item and the second electronic content item with the collection of electronic content comprises providing a virtual community comprising links to the first electronic content item and the second electronic content item, wherein the links are accessible via the collection of electronic content, wherein the virtual community is accessible via the first client account and the second client account.

* * * * *